US012562330B2

(12) United States Patent
Lagomarsini et al.

(10) Patent No.: US 12,562,330 B2
(45) Date of Patent: Feb. 24, 2026

(54) ELECTRICAL POWER SUPPLY CABLE COMPRISING A FUSE AND AN OVERMOLDED FUSE PROTECTION ELEMENT WITH OVERTHICKNESS

(71) Applicant: NEXANS, Courbevoie (FR)

(72) Inventors: Clara Lagomarsini, Lyons (FR); Adrien Charmetant, Miribel (FR); Valentin Adams, La Fouillouse (FR)

(73) Assignee: NEXANS, Courbevoie (FR)

( * ) Notice: Subject to any disclaimer, the term of this patent is extended or adjusted under 35 U.S.C. 154(b) by 279 days.

(21) Appl. No.: 17/913,763

(22) PCT Filed: Apr. 1, 2021

(86) PCT No.: PCT/FR2021/050574
§ 371 (c)(1),
(2) Date: Sep. 22, 2022

(87) PCT Pub. No.: WO2021/198619
PCT Pub. Date: Oct. 7, 2021

(65) Prior Publication Data
US 2023/0116099 A1 Apr. 13, 2023

(30) Foreign Application Priority Data
Apr. 3, 2020 (FR) ...................................... 2003341

(51) Int. Cl.
*H01H 85/02* (2006.01)
*H01B 7/02* (2006.01)
*H01B 9/00* (2006.01)

(52) U.S. Cl.
CPC ........... *H01H 85/0241* (2013.01); *H01B 7/02* (2013.01); *H01B 9/006* (2013.01)

(58) Field of Classification Search
CPC .... H01H 85/02; H01H 85/0241; H01H 85/30; H01H 85/143; H01H 85/157; H01B 7/02;
(Continued)

(56) References Cited

U.S. PATENT DOCUMENTS 2,172,226 A * 9/1939 Smith .................... H01H 85/36 337/248
2,414,865 A * 1/1947 Genter ................... H01R 4/308 337/191
(Continued)

FOREIGN PATENT DOCUMENTS

KR 101 744 660 6/2017

OTHER PUBLICATIONS

International Search Report dated Nov. 24, 2020.

*Primary Examiner* — William H. Mayo, III
(74) *Attorney, Agent, or Firm* — MUNCY, GEISSLER, OLDS & LOWE, P.C.

(57) ABSTRACT

An electrical power supply cable (10) for a photovoltaic installation includes an electrical conductor (12) having at least two electrical conductor portions (20, 22) and a fuse (24) arranged between the at least two electrical conductor portions. The at least one fuse electrically links the at least two electrical conductor portions. The cable (10) further has a protection element (30, 40, 50, 60) overmolded around the fuse and forming an electrical insulation layer, the protection element having at least one overthickness at at least one end portion (34, 36) of the protection element (30).

12 Claims, 2 Drawing Sheets

(58) Field of Classification Search

CPC . H01B 9/006; H01R 4/10; H01R 4/70; H01R 9/03; H01R 43/13; H01R 43/68

USPC .... 337/147 R, 186, 201, 205, 206, 241–244, 337/248, 251, 252, 415; 439/250, 621, 439/622, 893; 174/84 R, 84 C; 52/173.3

See application file for complete search history.

(56) References Cited

U.S. PATENT DOCUMENTS

| | | | | | |
|---|---|---|---|---|---|
| 2,668,211 | A * | 2/1954 | Matthysse | H01R 13/6278 | 439/372 |
| 2,770,757 | A * | 11/1956 | Edsall | H01H 85/201 | 361/104 |
| 3,085,138 | A * | 4/1963 | Brown | H01R 13/5219 | 337/201 |
| 3,818,407 | A * | 6/1974 | Edgerton | H01H 85/56 | 337/202 |
| 4,734,059 | A * | 3/1988 | Melugin | H01H 85/201 | 439/620.28 |
| 4,893,107 | A * | 1/1990 | Moner | H01H 85/201 | 174/521 |
| 6,046,665 | A * | 4/2000 | Oh | H01H 85/10 | 337/191 |
| 6,486,766 | B1 * | 11/2002 | Reid | H01H 85/201 | 337/252 |
| 7,358,845 | B2 * | 4/2008 | Moffat | H01H 85/24 | 337/237 |
| 10,992,254 | B2 * | 4/2021 | Solon | H01R 4/70 | |
| 2007/0019351 | A1 * | 1/2007 | Whitney | H01L 23/62 | 361/104 |
| 2013/0257580 | A1 * | 10/2013 | Gilman | H01H 1/5866 | 337/248 |

* cited by examiner

[Fig. 1]
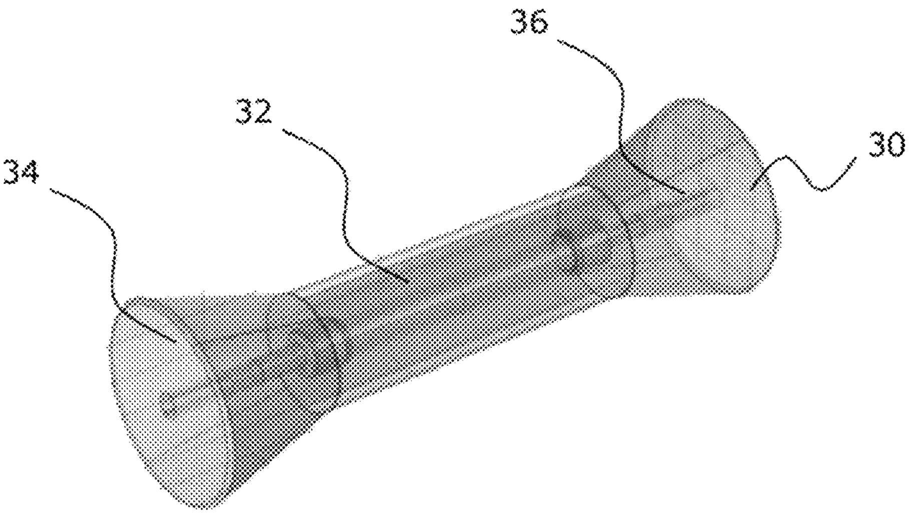
[Fig. 2]
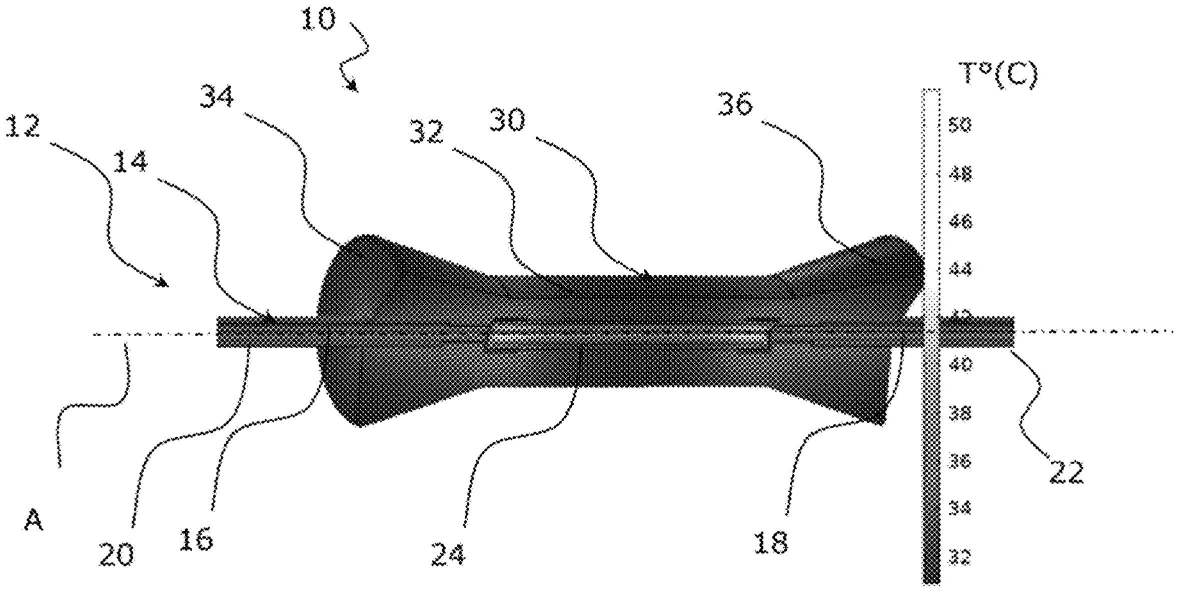

[Fig. 3]
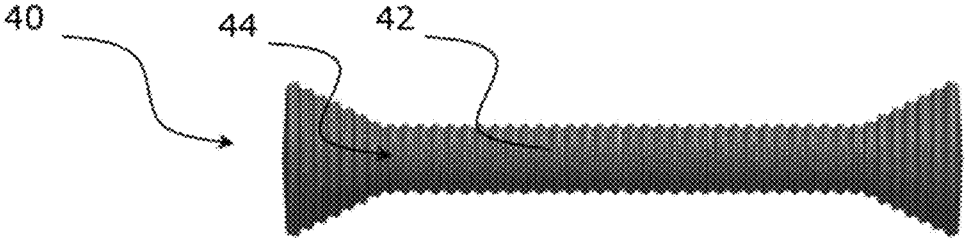
[Fig. 4]
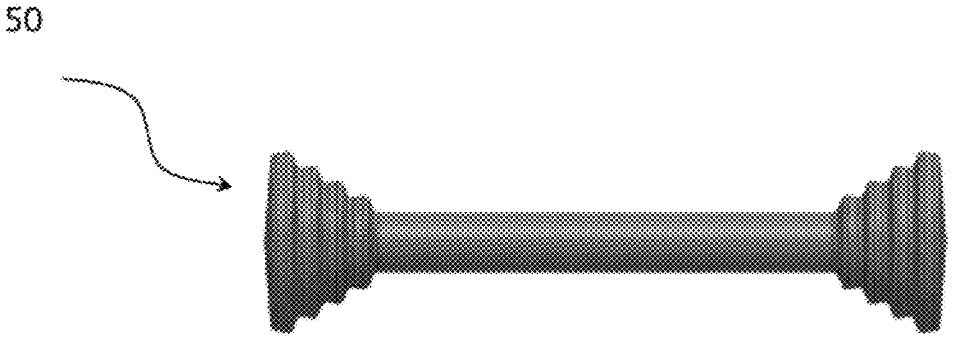
[Fig. 5]
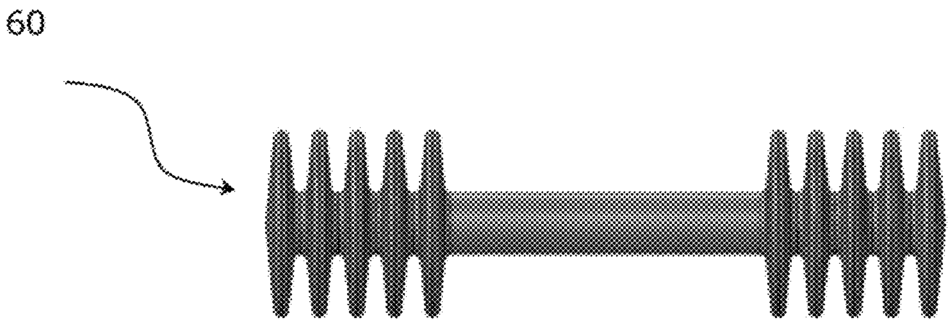

ELECTRICAL POWER SUPPLY CABLE COMPRISING A FUSE AND AN OVERMOLDED FUSE PROTECTION ELEMENT WITH OVERTHICKNESS

RELATED APPLICATION

This application is a National Phase of PCT/FR2021/050574 filed on Apr. 1, 2021, which claims the benefit of priority from French Patent Application No. 20 03341, filed on Apr. 3, 2020, the entirety of which are incorporated by reference.

The present invention relates to the field of electrical power supply cables, notably for a photovoltaic installation.

In particular, the invention relates to the power supply cables comprising a fuse around which is arranged an electrical protection element.

DESCRIPTION OF THE RELATED ART

A photovoltaic installation, e.g. of the photovoltaic solar power plant type, generally comprises electrical power supply cables and one or more fuses (cables called "photovoltaic harnesses"), the function of which is to prevent overcurrents that can damage the power supply cables themselves or photovoltaic panels of the installation. These electrical power supply cables are low-voltage cables.

These overcurrents can be linked to endogenous electrical defects, i.e. originating from electrical equipment of the installation (connector, switch, photovoltaic panel, multiplexing unit, etc.) or exogenous electrical defects, e.g. linked to lightning.

The fuse is, for example in the context of the NEXANS® KEYLIOS® Harnais PV solution, arranged in an electrical power supply cable by connecting the fuse in series in the electrical power supply cable to be protected. In other words, the electrical power supply cable comprises an electrical conductor connected in series to the fuse. In practice, the electrical power supply cable comprises a first electrical conductor portion, a fuse and a second electrical conductor portion connected in series with respect to one another.

In an installation configuration comprising a plurality of electrical power supply cables linked to one or more photovoltaic panels, these cables are mounted in parallel with respect to one another.

The fuse can be associated with the power supply cable according to a first technology in which the fuse is arranged in a fuse-holder coupled to two ends of electrical power supply cables or according to a second technology in which the fuse is incorporated inside an overmolding incorporated in the electrical power supply cable.

In this first technology, the fuse-holder comprises two connection couplings, each intended to be coupled to a connection end of an electrical power supply cable. The fuse-holder is therefore an added accessory external to the electrical power supply cable. The fuse-holder is not therefore manufactured at the same time as the electrical power supply cables in one and the same manufacturing process.

In this second technology, the fuse forms an integral part of the electrical power supply cable. The fuse is therefore incorporated inside the electrical power supply cable as part of the manufacturing thereof. A protection element is overmolded around the fuse during this manufacturing process.

OBJECTS AND SUMMARY

The present invention relates to this second technology incorporating the fuse inside the power supply cable with a protection element overmolded around the fuse.

This overmolded protection element ensures both the safety and the durability of the electrical power supply cable and of the fuse or fuses, notably linked to thermal aging, to the ingress of water and to the electrical stresses.

The protection element is thus designed to target and observe the following constraints:

- a maximum temperature of the body of the fuse; as indicated in the fuse manufacturer technical datasheet, the temperature of the body of the fuse should lower than a predetermined value (generally available in the technical datasheet of the component) to guarantee the integrity of the components of the fuse and thus ensure its correct operation,
- a maximum temperature of the overmolded material; the maximum temperature of the overmolded material should be lower than a predetermined value (generally available in the material technical datasheet) to avoid the effects of accelerated aging of the protection element and maintain its physical and chemical properties,
- a lifetime of the power supply cable; this lifetime should be greater than the lifetime generally expected for this type of photovoltaic installation electrical power supply cable, for example 20 years,
- a temperature of the outer surface of the protection element; the outer temperature of the protection element should in fact be lower than a predetermined value for safety reasons; one example of such a predetermined value is 95° C. according to the UL9703 standard,
- a maximum electrical field in the insulation of the electrical power supply cables and in the protection element.

Depending on the total current circulating in the electrical conductor of the electrical cable and in the fuse, a non-optimized design of the protection element can result in non-observance of one or more of the abovementioned constraints. In particular, it has been observed that the non-optimized known overmolded protection elements, notably of cylindrical shape or of uniform section, do not make it possible to observe the expected temperature values under certain installation conditions.

There is therefore a need for an electrical power supply cable comprising a fuse and a protection element that does not exhibit the above drawbacks.

In particular, there is a need for such an electrical power supply cable that makes it possible to observe all of the constraints associated with this type of cable, namely a maximum temperature of the body of the fuse, a maximum temperature of the overmolded material, a lifetime of the power supply cable, a temperature of the outer surface of the protection element and a maximum electrical field in the insulation of the electrical power supply cables and in the protection element.

To this end, the invention proposes an electrical power supply cable for a photovoltaic installation, comprising an electrical conductor having at least two electrical conductor portions and a fuse arranged between said at least two electrical conductor portions, said at least one fuse electrically linking said at least two electrical conductor portions, the cable further comprising a protection element overmolded around said fuse and forming an electrical insulation layer, said protection element comprising at least one overthickness at at least one end portion of the protection element.

Using thermal finite element models, it has been observed that, in normal operating conditions, the heat exchanges on the surface of the overmolded protection element play a major role in determining the temperature of the overmolded protection element and one of the other components in contact therewith (cable and fuse). An optimization of the design of the protection element is thus proposed to enhance the convective and radiation phenomena on its surface.

In particular, it has been observed that maximum heating occurred at the edges of the protection element, at the interface between the fuse and each of the portions of electrical power supply cable linked to the fuse.

The overthickness of material at at least one end portion of the protection element thus makes it possible to enhance the heat exchanges with the air surrounding the protection element. The heat emitted by the electrical conductors and the fuse is thus better dissipated which allows the protection element to observe the requisite constraints without requiring an excessive addition of material over the entire length of the protection element.

An optimized design of the protection element is therefore obtained in which the heat dissipation is enhanced in the zone where the maximum temperature is present. An optimization of the quantity of material used for the protection element and of its design can thus be achieved while guaranteeing good efficiency thereof.

The protection element is preferably overmolded on the fuse by low-pressure molding. The material forming the protection element is thus poured onto the fuse inside a mold. This low-pressure molding technique makes it possible to avoid any damage to the cable due to the molding pressure and guarantee a good positioning of the fuse throughout the molding.

The material and the dimensions of the protection element are chosen to render the protection element electrically insulating. The material is notably chosen according to its electrical conductivity and for its physical and chemical properties allowing it to be molded satisfactorily, notably by the abovementioned low-pressure molding method. As an example, the material can be chosen so as to exhibit an electrical conductivity equal to 0.3 W/(m*K).

According to one embodiment of the electrical power supply cable, the protection element is of annular section. The protection element can be of circular section.

According to one embodiment of the electrical power supply cable, the latter further comprises an insulating sheath arranged around said at least electrical conductor portions, said protection element at least partially overlapping said insulating sheath. The protection element is thus overmolded around the fuse and around a portion of the insulating sheath of the electrical power supply cable. The fuse is thus fully incorporated in the electrical power supply cable.

The overmolded protection element is preferably made of insulating material.

According to one embodiment of the electrical power supply cable, the protection element is made of polymer material, preferably of polyamide. Producing the protection element in polyamide makes it possible to obtain a good thermal dissipation, a good electrical insulation and easy manufacturing of the protection element by low-pressure molding.

According to one embodiment of the electrical power supply cable, each of said at least two electrical conductor portions extends along a main axis of the power supply cable, the protection element extending along this main axis, said at least one overthickness extending transversely to this main axis. The overthickness thus forms a protruding portion with respect to a body of the protection element.

According to one embodiment of the electrical power supply cable, said at least one overthickness extends at least partially around the main axis. Preferably, said at least one overthickness extends over all the angular segment of the transverse section of the protection element so as to form a ring. The heat dissipation is thus enhanced over all the circumference of the protection element.

According to one embodiment of the electrical power supply cable, said fuse has two ends each linked to an electrical conductor portion, the protection element extending along said main axis beyond or so as to match the two ends of said fuse. Thus, the protection element covers the interface zone between the electrical conductor and the fuse. The protection element is thus present in the zone where the temperature is maximal in use. Preferably, said at least one overthickness is arranged at this interface along the main axis.

According to one embodiment of the electrical power supply cable, said at least one overthickness has a maximum transverse dimension at least 20% greater than the maximum transverse dimension of a central portion of the protection element arranged on said fuse, preferably at least 50% greater, even more preferably at least 70% greater.

According to one embodiment of the electrical power supply cable, the protection element has a cross-section at least partially increasing from a central portion arranged on said fuse to said at least one end portion. "At least partially increasing" is understood to mean the fact that the end portion comprises, at least locally, a cross-section greater than the maximum cross-section of the central portion. The cross-section of said at least one end portion can itself be increasing or constant. Furthermore, the cross-section of said at least one end portion can be increasing then decreasing.

Preferably, the protection element has a maximum cross-section at said at least one end portion. Even more preferably, the protection element has a maximum cross-section at the end of the fuse along the main axis.

Alternatively, the maximum cross-section of the protection element can be offset from the end of the fuse along the main axis. Thus, this maximum cross-section can be formed upstream or downstream of this end of the fuse along the main axis from the center toward the ends of the protection element.

The position of the maximum cross-section is a trade-off between the energy dissipation making it possible to observe the requisite maximum temperatures and a good mechanical strength of the interface between the fuse and the electrical conductor. Preferably, the maximum cross-section is arranged downstream of the end of the fuse along the main axis from the center toward the ends of the protection element. In other words, this maximum cross-section is preferably arranged between an end of the protection element and the end of said fuse, along the main axis.

According to one embodiment of the electrical power supply cable, the protection element has an outer surface having a plurality of reliefs. In other words, the outer surface of the protection element is textured so as to enhance the convective and radiation exchanges with the surrounding air. This notably makes it possible to reduce the weight of the protection element while observing the requisite constraints.

The plurality of reliefs forms a local variation of the section of the protection element increasing the surface for exchange with the surrounding air. A distinction is made between the local variation of cross-section, the variation of which is less than 15% of the cross-section of the protection element at its central portion, and the overall variation of cross-section, the variation of which is greater than or equal to 15% of the cross-section of the protection element at its central portion.

The plurality of reliefs can be formed at a first end portion and/or the central portion and/or a second end portion.

BRIEF DESCRIPTION OF THE DRAWINGS

The attached drawings illustrate the invention:

FIG. 1 schematically represents a perspective view of an electrical power supply cable comprising a fuse and a first embodiment of an overmolded protection element.

FIG. 2 schematically represents a distribution of the temperatures inside the electrical power supply cable comprising the first embodiment of the protection element.

FIG. 3 schematically represents a side view of a second embodiment of the overmolded protection element.

FIG. 4 schematically represents a side view of a third embodiment of the overmolded protection element.

FIG. 5 schematically represents a side view of a fourth embodiment of the overmolded protection element.

DESCRIPTION OF EMBODIMENT(S)

The design of the invention is described more fully hereinbelow with reference to the attached drawings, in which embodiments of the design of the invention are shown. In the drawings, the size and the relative sizes of the elements may be exaggerated for the purposes of clarity. Similar numbers refer to similar elements in all the drawings. However, this design of the invention can be implemented in many different forms and should not be interpreted as being limited to the embodiments explained here. Instead, these embodiments are proposed such that this description is comprehensive, and communicate the extent of the design of the invention to the person skilled in the art.

A reference throughout the specification to "one embodiment" means that a functionality, a structure, or a particular feature described in relation to one embodiment is included in at least one embodiment of the present invention. Thus, the appearance of the expression "in one embodiment" at various locations throughout the specification does not necessary refer to the same embodiment. Furthermore, the functionalities, the structures, or the particular features can be combined in any appropriate manner in one or more embodiments. Furthermore, the term "comprising" does not exclude other elements or steps.

Referring to FIGS. 1 and 2, an electrical power supply cable 10 for a photovoltaic installation comprises an electrical conductor 12 and an insulating sheath 14 arranged around the electrical conductor 12. The electrical power supply cable 10 extends along a main axis A.

The electrical conductor 12 comprises a first 16 and a second 18 electrical conductor portions. The insulating sheath 14 also comprises a first 20 and a second 22 insulating sheath portions respectively arranged around first 16 and second 18 electrical conductor portions.

The electrical power supply cable 10 also comprises a fuse 24 arranged and electrically connected between the first 16 and second 18 electrical conductor portions.

The electrical power supply cable 10 further comprises a first embodiment of a protection element 30 overmolded around the fuse 24. The protection element 30 comprises a central portion 32 arranged around the fuse 24. The central portion 32 is of constant circular section.

The protection element 30 also comprises a first 34 and a second 36 end portions arranged on either side of the central portion 32. The first 34 and second 36 end portions are of increasing circular cross-section along the main axis A from the central portion 32 to the ends of the protection element 30. This increasing section thus forms an overthickness. In particular, the first 34 and second 36 end portions each form a tapered portion, the maximum cross-section of which is formed at the ends of the protection element 30. The base of each of the first 34 and second 36 end portions begins at an end 38 of the fuse 24, along the main axis A.

Referring to FIG. 2, it can be seen that the maximum temperature determined is approximately 50° C. at the interface between the fuse 24 and the electrical conductor 12 when the protection element 30 is in use. In particular, it has been observed that, for ambient temperature values of between 30° C. and 90° C., the protection element 30 observes the requisite constraints.

A second embodiment of the protection element is presented in FIG. 3. A protection element 40 differs from the first embodiment of the protection element 30 in that a plurality of reliefs 42 is formed on an outer surface 44 of the protection element 40. The reliefs 42 are, here, formed over all of the outer surface 44. The reliefs 42 are formed by a plurality of local circular overthicknesses.

The protection element 40 combines a cross-section increasing toward its ends and a plurality of reliefs on all of its outer surface 44. It has been observed that, of the embodiments presented, the protection element 40 exhibits the best heat dissipation.

Referring to FIG. 4, a third embodiment of the protection element is presented. A protection element 50 differs from the protection element 40 in that the increase of section of the first 34 and second 36 end portions is discontinuous. In other words, the first 34 and second 36 end portions form a stepped cross-section.

Referring to FIG. 5, a third embodiment of the protection element is presented. A protection element 60 comprises first 34 and second 36 end portions, the cross-section of which is successively increasing then decreasing to form a plurality of disks along the main axis A.

The invention claimed is:

1. An electrical power supply cable for a photovoltaic installation, comprising:

an electrical conductor extending along a main axis and having at least two electrical conductor portions and a fuse arranged in between said at least two electrical conductor portions, each of said at least two electrical conductor portions extends along a main axis of the power supply cable, said at least one fuse electrically linking said at least two electrical conductor portions, the cable further comprising a protection element overmolded around said fuse and forming a layer of electrical insulation, said protection element extending along this main axis and comprising a central portion arranged around the fuse and two end portions arranged on either side of the central portion of the protection element and around the electrical conductor portions, the protection element having a maximum cross-section at at least one of the end portions, said maximum cross-section forming an overthickness of the protection element and being offset.

2. The electrical power supply cable as claimed in claim 1, further comprising an insulating sheath arranged around said at least two electrical conductor portions, said protection element at least partially overlapping said insulating sheath.

3. The electrical power supply cable as claimed in claim 1, wherein the protection element is made of polymer material.

4. The electrical power supply cable as claimed in claim 3, wherein the protection element is made of polyamide.

5. The electrical power supply cable as claimed in claim 1, wherein said at least one overthickness extending transversely to this main axis.

6. The electrical power supply cable as claimed in claim 5, wherein said at least one overthickness extends at least partially around the main axis.

7. The electrical power supply cable as claimed in claim 5, wherein said fuse has two ends each linked to an electrical conductor portion, the protection element extending along said main axis beyond the two ends of said fuse.

8. The electrical power supply cable as claimed in claim 1, wherein said at least one overthickness has a maximum transverse dimension at least 20% greater than the maximum transverse dimension of a central portion of the protection element arranged on said fuse.

9. The electrical power supply cable as claimed in claim 8, wherein said at least one overthickness has a maximum transverse dimension at least 50% greater than the maximum transverse dimension of a central portion of the protection element arranged on said fuse.

10. The electrical power supply cable as claimed in claim 8, wherein said at least one overthickness has a maximum transverse dimension at least 70% greater than the maximum transverse dimension of a central portion of the protection element arranged on said fuse.

11. The electrical power supply cable as claimed in claim 1, wherein the protection element has a cross-section at least partially increasing from a central portion arranged on said fuse to said at least one end portion.

12. The electrical power supply cable as claimed in claim 1, wherein the protection element has an outer surface having a plurality of reliefs.

* * * * *